(12) United States Patent
Matsukawa

(10) Patent No.: US 10,773,158 B2
(45) Date of Patent: *Sep. 15, 2020

(54) METHOD AND APPARATUS FOR THE PROJECTION OF IMAGES, VIDEO, AND/OR HOLOGRAMS GENERATED BY A COMPUTER SIMULATION

(71) Applicant: Sony Interactive Entertainment Inc., Tokyo (JP)

(72) Inventor: Takeo Matsukawa, San Jose, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,297

(22) Filed: Aug. 15, 2019

(65) Prior Publication Data

US 2019/0366205 A1    Dec. 5, 2019

Related U.S. Application Data

(63) Continuation of application No. 15/947,713, filed on Apr. 6, 2018, now Pat. No. 10,384,122, which is a
(Continued)

(51) Int. Cl.
*A63F 13/27* (2014.01)
*A63F 13/332* (2014.01)
(Continued)

(52) U.S. Cl.
CPC .............. *A63F 13/27* (2014.09); *A63F 13/24* (2014.09); *A63F 13/26* (2014.09); *A63F 13/28* (2014.09); *A63F 13/332* (2014.09); *A63F 13/92* (2014.09)

(58) Field of Classification Search
None
See application file for complete search history.

(56) References Cited

U.S. PATENT DOCUMENTS 4,921,319 A    5/1990  Mallik
6,243,054 B1   6/2001  DeLuca
(Continued)

FOREIGN PATENT DOCUMENTS

CN    103083901    5/2013
CN    103272383    9/2013
(Continued)

OTHER PUBLICATIONS

Dolcourt, Jessica; "Samsung Galaxy Beam 2 is a larger projector phone", CNET; http://www.cnet.com/products/samsung-galaxy-beam-2/, Apr. 25, 2014, pp. 1-3.
(Continued)

*Primary Examiner* — Ronald Laneau
(74) *Attorney, Agent, or Firm* — Fitch, Even, Tabin & Flannery LLP

(57) ABSTRACT

A method includes running a computer simulation that is controlled at least in part by a handheld controller, displaying images generated by the computer simulation on a display, and projecting at least one image generated by the computer simulation from an image projector coupled to the handheld controller. A system includes a display, a handheld controller, an image projector coupled to the handheld controller, and a processor based apparatus. Another system includes a display, a handheld controller, an image projector that is housed in a unit configured to be releasably docked to the handheld controller, and a processor based apparatus. Storage mediums storing one or more computer programs are also provided.

40 Claims, 11 Drawing Sheets

Related U.S. Application Data continuation of application No. 14/994,027, filed on Jan. 12, 2016, now Pat. No. 9,937,420.

(60) Provisional application No. 62/234,570, filed on Sep. 29, 2015.

(51) Int. Cl.
*A63F 13/24* (2014.01)
*A63F 13/26* (2014.01)
*A63F 13/28* (2014.01)
*A63F 13/92* (2014.01)

(56) References Cited

U.S. PATENT DOCUMENTS

| | | | |
|---|---|---|---|
| 6,559,813 B1 | 5/2003 | DeLuca | |
| 6,773,349 B2 | 8/2004 | Hussaini | |
| 7,565,295 B1 | 7/2009 | Hernandez-Rebollar | |
| 7,927,216 B2 | 4/2011 | Ikeda | |
| 8,070,571 B2 | 12/2011 | Argentar | |
| 9,002,766 B2 | 4/2015 | Trainor-Guitton | |
| 9,244,532 B2 | 1/2016 | Olien | |
| 9,573,710 B2 | 2/2017 | Hendricks | |
| 9,910,507 B2 | 3/2018 | Okuno | |
| 9,937,420 B2 | 4/2018 | Matsukawa | |
| 10,080,960 B2 | 9/2018 | Takemoto | |
| 10,384,122 B2 | 8/2019 | Matsukawa | |
| 2006/0205505 A1 | 9/2006 | Hussaini | |
| 2007/0099700 A1 | 5/2007 | Solomon | |
| 2009/0073324 A1* | 3/2009 | Tan | H04N 5/2628 348/745 |
| 2009/0280901 A1 | 11/2009 | Casparian | |
| 2010/0137026 A1 | 6/2010 | Kim | |
| 2010/0141780 A1* | 6/2010 | Tan | H04N 9/3182 348/222.1 |
| 2010/0157307 A1 | 6/2010 | Taillade | |
| 2011/0002019 A1 | 1/2011 | Routley | |
| 2011/0019167 A1* | 1/2011 | Pines | G03B 35/26 355/22 |
| 2011/0092290 A1 | 4/2011 | Huebner | |
| 2012/0115555 A1 | 5/2012 | Cho | |
| 2012/0214588 A1 | 8/2012 | You | |
| 2012/0262487 A1 | 10/2012 | Huebner | |
| 2017/0087457 A1 | 3/2017 | Matsukawa | |
| 2018/0221763 A1 | 8/2018 | Matsukawa | |

FOREIGN PATENT DOCUMENTS

| | | |
|---|---|---|
| JP | 200833202 | 2/2008 |
| JP | 2012220757 | 11/2012 |
| WO | 2008117102 | 10/2008 |

OTHER PUBLICATIONS

Gsmarena; "Samsung I8530 Galaxy Beam—Full phone specifications", http://www.gsmarena.com/samsung_i8530_galaxy_beam-4566.php, archived on Jan. 14, 2016, pp. 1-2.

Mies, Ginny; "First Look: Samsung's Galaxy Beam Android Phone with a Built-In Projector", PC World, www.pcworld.com/article/250706/first_look_samsungs_galaxy_beam_android_phone_with_a_built_in_projector.html; Mobile World Congress (MWC) 2012; archived on Jan. 14, 2016, pp. 1-3.

Mills, Chris; "A not-so-shining future: the sad demise of the projector phone", http://www.techradar.com/us/news/phone-and-communications/mobile-phones/a-not-so-shining-future-the-sad-demise-of-the-projector-phone-1250993, Tech Radar, May 29, 2014, pp. 1-13.

Pratap, Ketan; "Samsung Galaxy Beam 2 projector phone with 4.66inch display launched", Gadgets360; http://gadgets.ndtv.com/mobiles/news/samsung-galaxy-beam-2-projector-phone-with-466-inch-display-launched-513348, Apr. 24, 2014, pp. 1-4.

Price, Emily; "Samsung shows off latest Galaxy Beam projector phone", Gizmag, http://www.gizmag.com/samsung-galax-beam/21606/, Feb. 26, 2012, pp. 1-16.

Samsung Mobile; "Samsung Galaxy Beam", http://www.samsung.com/global/microsite/galaxybeam/feature.html, archived on Jan. 14, 2016, pp. 1-10.

Wikipedia; "Handheld projector", https://en.wikipedia.org/wiki/Handheld_projector, archived on Jan. 14, 2016, pp. 1-5.

Patent Cooperation Treaty; "Notification of Transmittal of the International Search Report and the Written Opinion of the International Searching Authority, or the Declaration" issued in PCT Application No. PCT/US16/52358, dated Dec. 8, 2016; 2 pages.

Patent Cooperation Treaty; "International Search Report" issued in PCT Application No. PCT/US16/52358, dated Dec. 8, 2016; 2 pages.

Patent Cooperation Treaty; "Written Opinion of the International Searching Authority" issued in PCT Application No. PCT/US16/52358, dated Dec. 8, 2016; 16 pages.

USPTO; Notice of Allowance and Fee(s) Due issued in U.S. Appl. No. 14/994,027, dated Dec. 6, 2017, 5 pages.

USPTO; Non-Final Office Action issued in U.S. Appl. No. 14/994,027, dated Jun. 19, 2017, 26 pages.

USPTO; Non-Final Office Action issued in U.S. Appl. No. 15/947,713, dated Oct. 5, 2018, 8 pages.

Japanese Patent Office; Notification of Reason(s) for Refusal issued in Japanese Patent Application No. 2018-513493, dated Jan. 22, 2019, 9 pages (includes English translation).

Chinese Patent Office; the First Office Action issued in Chinese Patent Application No. 201680053612.4, dated Jan. 18, 2019, 12 pages (includes English translation).

European Patent Office; Extended European Search Report issued in European Patent Application No. 16852308.2, dated Mar. 8, 2019, 7 pages.

USPTO; Notice of Allowance and Fee(s) Due issued in U.S. Appl. No. 15/947,713, dated Mar. 26, 2019, 5 pages.

European Patent Office; Communication Pursuant to Rules 70(2) and 70a(2) EPC issued in European Patent Application No. 16852308.2, dated Mar. 26, 2019, 1 page.

USPTO; Notice of Allowability issued in U.S. Appl. No. 15/947,713, dated Apr. 9, 2019, 2 pages.

Japanese Patent Office; Decision of Refusal issued in Japanese Patent Application No. 2018-513493, dated Jun. 25, 2019, 8 pages (includes English translation).

USPTO; Corrected Notice of Allowability issued in U.S. Appl. No. 15/947,713, dated Jul. 11, 2019, 2 pages.

Chinese Patent Office; Notification of the Decision to Grant a Patent Right issued in Chinese Patent Application No. 201680053612.4, dated Jul. 18, 2019, 5 pages (includes English translation).

* cited by examiner

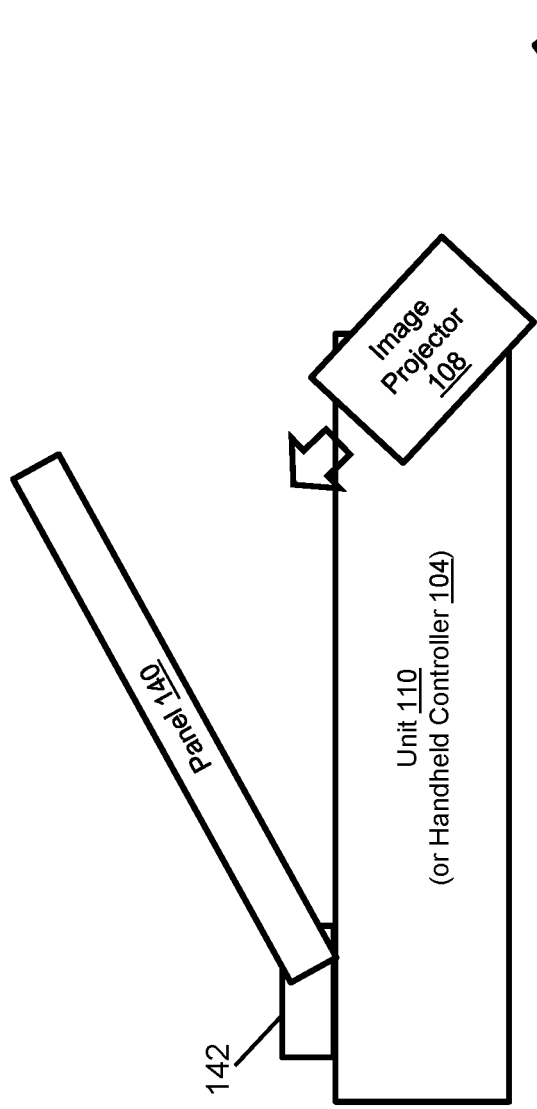
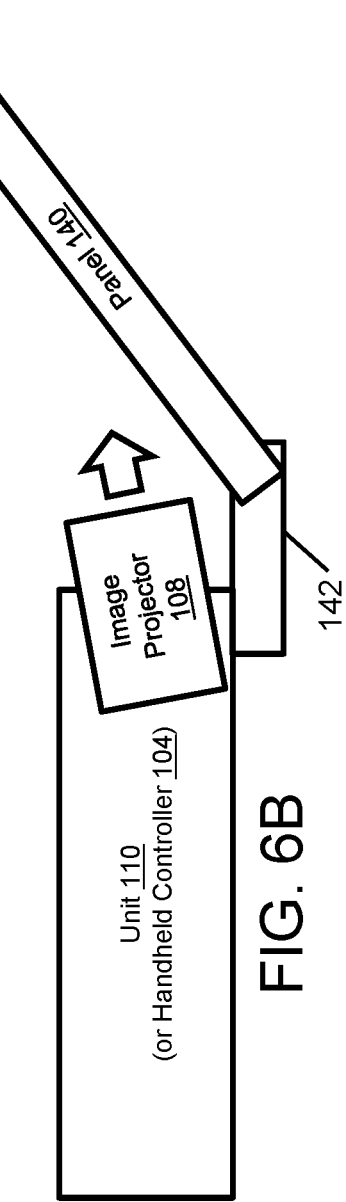
FIG. 6A
FIG. 6B

METHOD AND APPARATUS FOR THE PROJECTION OF IMAGES, VIDEO, AND/OR HOLOGRAMS GENERATED BY A COMPUTER SIMULATION

CROSS-REFERENCE TO RELATED APPLICATIONS

This application is a continuation of U.S. patent application Ser. No. 15/947,713, filed on Apr. 6, 2018, entitled "METHOD AND APPARATUS FOR THE PROJECTION OF IMAGES, VIDEO, AND/OR HOLOGRAMS GENERATED BY A COMPUTER SIMULATION," which is a continuation of U.S. patent application Ser. No. 14/994,027, filed on Jan. 12, 2016, entitled "METHOD AND APPARATUS FOR THE PROJECTION OF IMAGES, VIDEO, AND/OR HOLOGRAMS GENERATED BY A COMPUTER SIMULATION," which claims the benefit of U.S. Provisional Patent Application No. 62/234,570, filed on Sep. 29, 2015, entitled "METHOD AND APPARATUS FOR THE PROJECTION OF IMAGES, VIDEO, AND/OR HOLOGRAMS GENERATED BY A COMPUTER SIMULATION," the entire contents and disclosures of which are all hereby fully incorporated by reference herein in their entireties.

BACKGROUND OF THE INVENTION

1. Field of the Invention

Embodiments of the present invention relate generally to computer simulation output technology, and more specifically to image, video, and audio output technology that may be employed by computer simulations, such as computer games and video games.

2. Discussion of the Related Art

Computer games, such as video games, have become a popular source of entertainment. Computer games are typically implemented in computer game software applications and are often run on game consoles, entertainment systems, desktop, laptop, and notebook computers, portable devices, pad-like devices, etc. Computer games are one type of computer simulation.

The user of a computer game is typically able to view the game play on a display and control various aspects of the game with a handheld controller, such as a game controller, game pad, wand, motion sensing controller, joystick, mouse, or other types of handheld controllers. Computer games typically also include audio output so that the user can hear sounds generated by the game, such as for example, the sounds generated by other players' characters like voices, footsteps, physical confrontations, gun shots, explosions, car chases, car crashes, etc.

SUMMARY OF THE INVENTION

One embodiment provides a method, comprising: running, with a processor based apparatus, a computer simulation that is controlled at least in part by a handheld controller; displaying images generated by the computer simulation on a display; and projecting at least one image generated by the computer simulation from an image projector coupled to the handheld controller.

Another embodiment provides a system, comprising: a display; a handheld controller; an image projector coupled to the handheld controller; and a processor based apparatus in communication with the display, the handheld controller, and the image projector; wherein the processor based apparatus is configured to execute steps comprising: running a computer simulation that is controlled at least in part by the handheld controller; sending images generated by the computer simulation to the display; and sending at least one image generated by the computer simulation to the image projector.

Another embodiment provides a non-transitory computer readable storage medium storing one or more computer programs configured to cause a processor based system to execute steps comprising: running a computer simulation that is controlled at least in part by a handheld controller; sending images generated by the computer simulation to a display; and sending at least one image generated by the computer simulation to an image projector coupled to the handheld controller.

Another embodiment provides a non-transitory computer readable storage medium storing one or more computer programs configured to cause a processor based system to execute steps comprising: running a computer simulation that is controlled at least in part by a handheld controller; sending images generated by the computer simulation to a display; and sending at least one image generated by the computer simulation to an image projector that is housed in a unit configured to be releasably docked to the handheld controller.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIGS. 6A and 6B are block diagrams illustrating the use of a panel and an image projector to form a hologram in accordance with embodiments of the present invention;

DETAILED DESCRIPTION

As mentioned above, computer games, such as video games, have become a popular source of entertainment. Currently, the video output of most computer games is typically displayed on a single display, such as for example a monitor or television (TV). As such, when playing a computer game the user typically just keeps looking at the same spot, namely the single display.

In some embodiments, the present invention makes computer games and other types of computer simulations more interactive and entertaining by adding an image projection output that is used in addition to the traditional video display output. In some embodiments, images are projected from the handheld controller that is used by the user to control the computer simulation. This allows the user to display the extra projected images on a wall, the floor, the ceiling, or anywhere the user points the handheld controller. For example, the user can project a map on the floor or on a wall in order to explore the town, forest, etc., in the game.

In some embodiments, holographic images are projected. That is, images projected from the handheld controller may be used to form a hologram. This allows, for example, a person's face or entire body, such as a character in a game, to be projected into the air and suspended there. And in some embodiments, the system also generates audio that is associated with the projected images. This allows, for example, a voice to be added to the hologram of the game character, which in turn allows the hologram to speak to the user to, for example, provide orders to follow the next mission or some other instructions or information.

Figure 1:
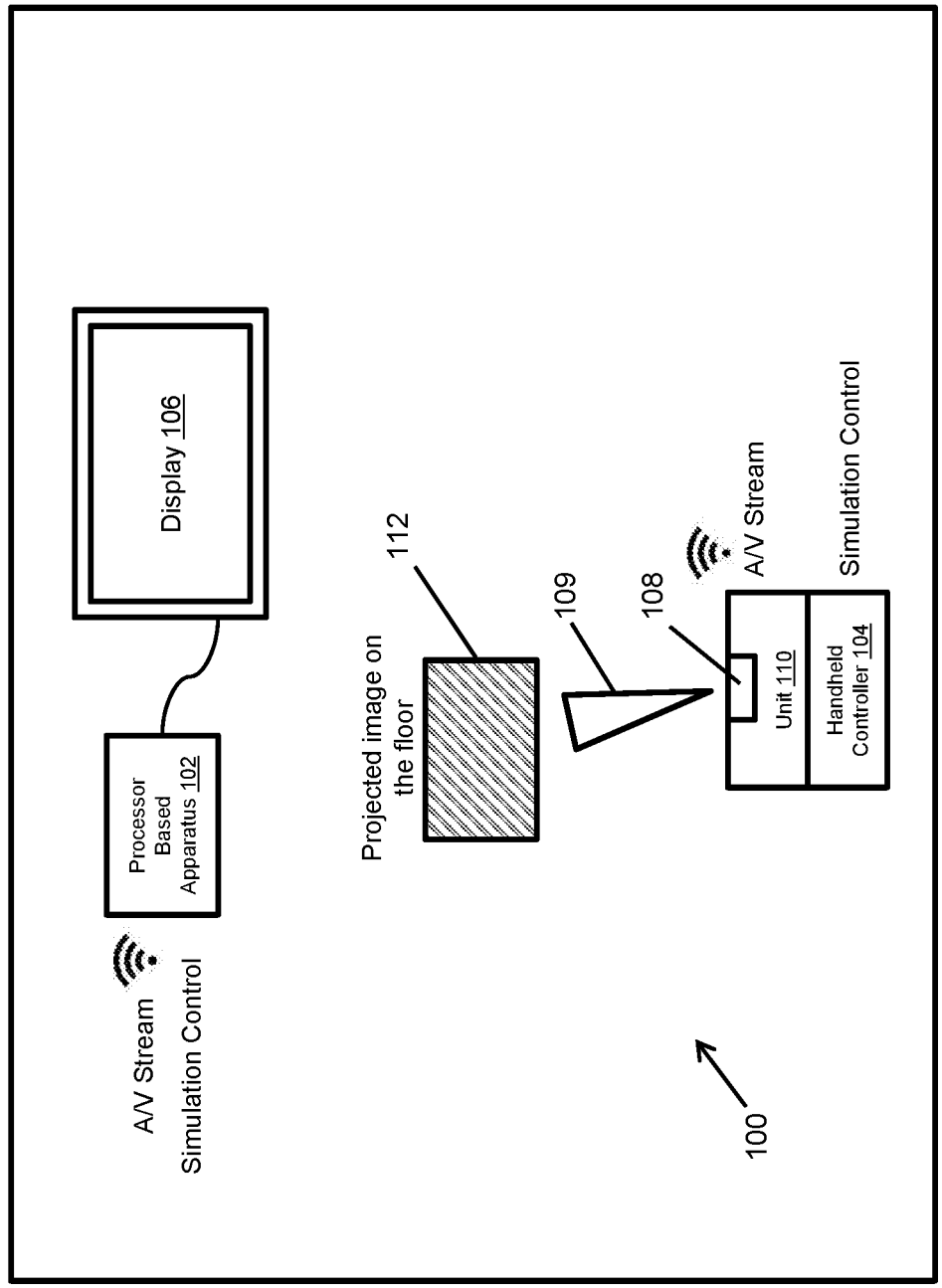
FIGS. 1, 2, and 3 are block diagrams illustrating a system in accordance with embodiments of the present invention.

Referring to FIG. 1, there is illustrated a block diagram of a system 100 in accordance with an embodiment of the present invention. The system 100 includes a processor based apparatus 102, such as a game console or entertainment system. The processor based apparatus 102 is capable of running a computer simulation, such as a computer game or video game. The computer simulation is controlled at least in part by a handheld controller 104, such as a game controller, game pad, wand, or any other type of handheld controller.

A display 106 is used for displaying images generated by the computer simulation. The display 106 may comprise any type of display, such as a monitor, TV, or any other type of display. The display 106 may be coupled to, or in communication with, the processor based apparatus 102 via a wired or wireless connection.

In some embodiments, an image projector 108 is coupled to the handheld controller 104. An image projector is an optical device that projects images onto a surface. A small scale or miniaturized image projector is known as a pico projector, handheld projector, or mobile projector. Some major imager technologies employed by pico projectors include Digital Light Processing (DLP), Liquid Crystal on Silicon (LCoS), and laser. The image projectors discussed herein may comprise any of these types of image projectors, as well as any other types of image projectors.

In some embodiments, the image projector 108 is coupled to the handheld controller 104 by being built into the handheld controller 104. For example, the image projector 108 may be included and/or mounted in the housing of the handheld controller 104. Or, the image projector 108 may be integrated, incorporated, and/or combined with the handheld controller 104 in some other way. A version of this type of coupling of the image projector 108 to the handheld controller 104 will be discussed below, with an example provided in FIG. 9.

In some embodiments, the image projector 108 is coupled to the handheld controller 104 by being housed in a unit 110 that is capable of being removably or releasably attached or docked to the handheld controller 104, which is what is illustrated in FIG. 1. For example, the unit 110 and the handheld controller 104 may be configured such that the unit 110 can be docked with the handheld controller 104, and then easily undocked. The unit 110 may be small so that it can be docked or attached to the handheld controller 104 using a mount, holder, bracket, or similar releasable attachment or docking mechanism. In this way, in some embodiments, the image projector 108 is housed in the unit 110 that is configured to be releasably docked to the handheld controller 104. In some embodiments, the unit 110 is operational whether or not it is docked with the handheld controller 104. For example, a stand-alone use of the unit 110 will be discussed below.

During operation of the system 100, the processor based apparatus 102 runs a computer simulation that is controlled at least in part by the handheld controller 104, which is manipulated by a user. Images generated by the computer simulation are sent to the display 106 where the images are display to the user. In addition, at least one image generated by the computer simulation is sent to the image projector 108.

In some embodiments, the at least one image generated by the computer simulation is sent to the image projector 108 via wireless streaming. For example, a WiFi or other wireless connection may be used by the processor based apparatus 102 to send the at least one image generated by the computer simulation to the image projector 108.

Once received, the image projector 108 projects the at least one image generated by the computer simulation. The projection of the image by the image projector 108 is indicated by the beam 109. In the example shown in FIG. 1, the image projector 108 projects the image onto the floor, which is indicated by the image 112. It should be understood, however, that the image 112 can be projected onto any surface, such as a wall or ceiling, or even into the air to form a hologram, as will be discussed below.

In some embodiments, the unit 110 also includes one or more audio speakers, such as stereo speakers, or an audio output jack (for connection to external speakers) so that sounds can be heard by the user while viewing the projected image 112. For example, the computer simulation may generate one or more audio signals that are associated with the at least one image generated by the computer simulation that is sent to the image projector 108. The processor based apparatus 102 then provides the one or more audio signals to the unit 110 or wherever the audio circuitry associated with the projector 108 is located. In some embodiments, the processor based apparatus 102 provides the one or more audio signals to the unit 110 via wireless streaming, such as by the above-mentioned WiFi or other wireless connection. Thus, as is the usual use case, the handheld controller 104 is generally connected to the processor based apparatus 102, such as a game console, via a wireless connection for the gaming control (or more generally, for simulation control). The unit 110 may be connected through another wireless link and stream audio and video (A/V) using some compressed data format.

Thus, the system 100 provides a solution that gives the user a secondary interactive image 112 near or around user.

By moving and/or pointing the handheld controller 104, the user can project the image 112 wherever he or she wants, such as on the floor, or on the wall, or on a table, etc. This provides a more entertaining and exciting experience for the user than previous systems in which the user played a game by viewing a single display, such as a single PC monitor or a TV. In such previous systems there was no additional vision involved during the game play, and that disadvantage is solved by the system 100. The system 100 provides the user with a secondary, interactive image/screen in a reasonably compact system. Furthermore, the system 100 provides a compact video/audio system that can be integrated with, or into, an existing handheld controller using projecting technology.

Figure 2:
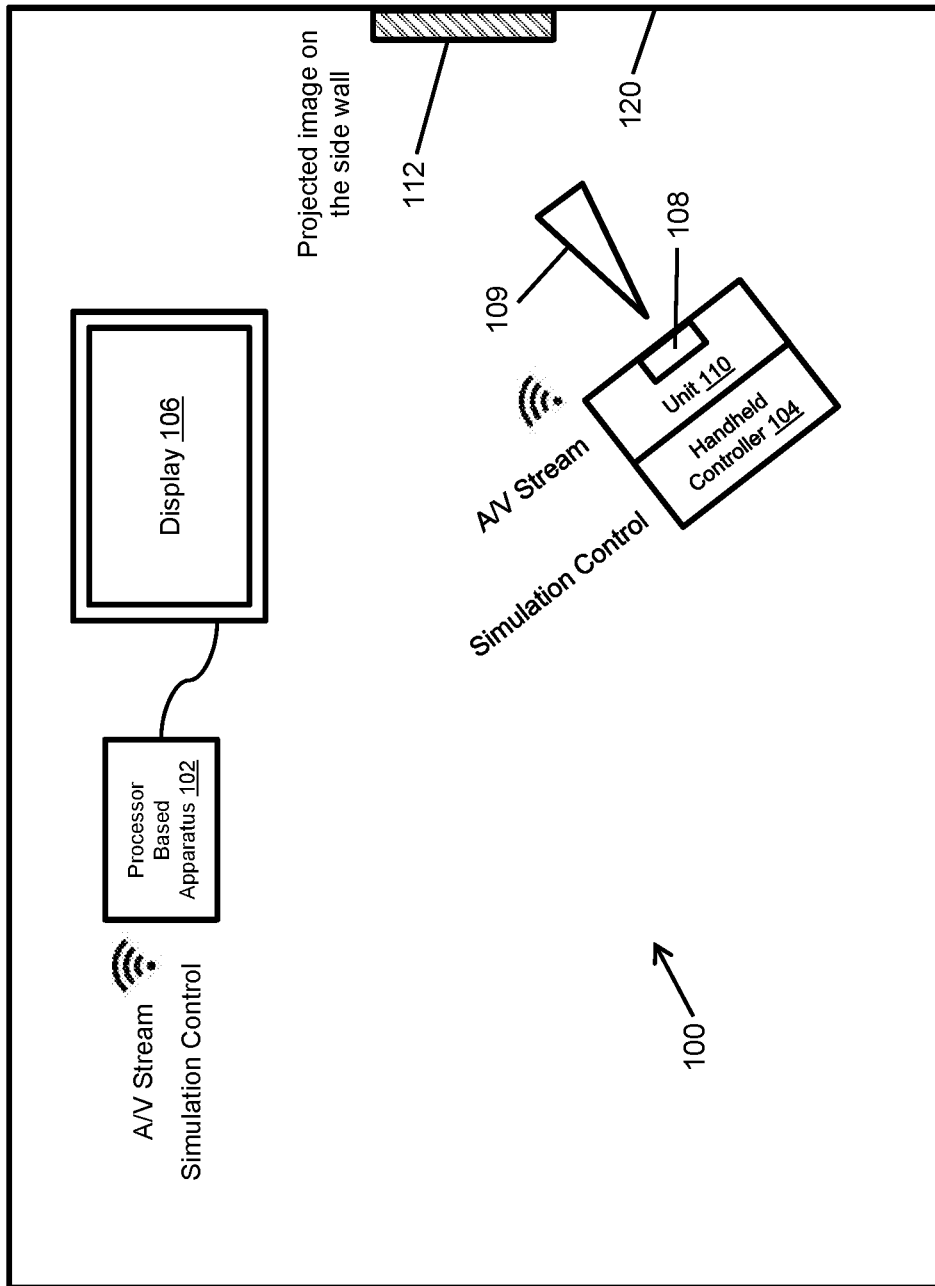

FIG. 2 illustrates an example of how the system 100 can be used to project an image on a wall. Specifically, the system 100 is again illustrated, but this time the handheld controller 104 and attached unit 110 are moved to a different position. In the illustrated position the image projector 108 projects the image 112 onto a side wall 120. The projection of the image by the image projector 108 is indicated by the beam 109.

Figure 3:
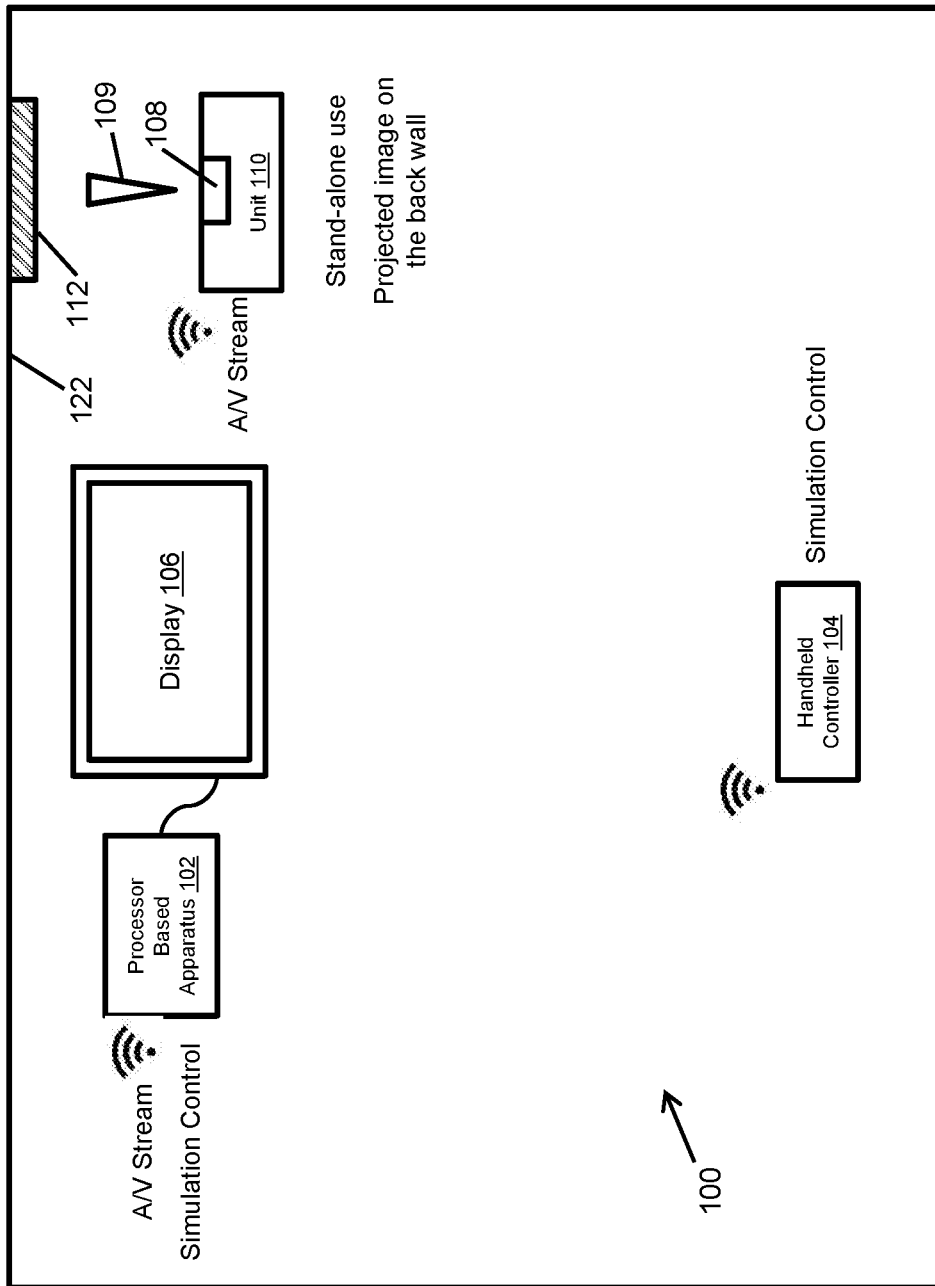

It was mentioned above that in some embodiments, the unit 110 is operational whether or not it is docked with the handheld controller 104, and that an example of an undocked, stand-alone use of the unit 110 would be discussed. FIG. 3 illustrates a stand-alone use of the unit 110 in accordance with an embodiment of the present invention. Specifically, the system 100 is again illustrated, but this time the unit 110 is undocked or detached from the handheld controller 104 and moved to a different location. The unit 110 is still fully operational, and as such the image projector 108 projects the image 112 onto whatever surface the projector 108 is pointed at, such as the floor, a wall, the ceiling, etc. In the illustrated example, the image projector 108 projects the image 112 onto the back wall 122. Again, the projection of the image by the image projector 108 is indicated by the beam 109. By having the unit 110 remain in one location/position and projecting on the back wall 122 next to the display 106, the projected image 112 in some respects mimics a more traditional second display.

This optional stand-alone feature allows the user to remove the unit 110, and thus the image projector 108, from being coupled to the handheld controller 104, and have the image projector 108 continue to project an image. Such removal may be desirable if, for example, the user intends to subject the handheld controller 104 to many rapid motions but prefers the projected image to be stable. Whenever the user chooses, the unit 110 can be docked back onto the handheld controller 104 so that the user once again can have more control over the direction of the image projection.

Thus, in some embodiments, the unit 110 includes an audio/video streaming capability through a wireless connection such as WiFi with the processor based apparatus 102, which may comprise a game console, entertainment system, PC, etc. In some embodiments, the unit 110 includes a docking capability with a handheld controller. In some embodiments, the unit 110 can also operate as a stand-alone unit so that the user can, for example, undock it from the handheld controller and place the unit 110 at a certain location.

Whether the unit 110 is docked to the handheld controller 104, or the unit 110 is undocked, or the image projector 108 is built into the handheld controller 104, the image projector 108 may project any type of image(s). For example, the image projector 108 may project still images, moving images, video, or any other type of pictures or images. The image projector 108 may project images or video onto any surface. It is believed that projecting onto a flat surface will provide good results, but the projection may be onto any surface. Furthermore, as mentioned above and as will be discussed more below, the image projector 108 may project images and/or video into the air to form a hologram.

In some embodiments, the processor based apparatus 102 will initially detect or determine whether or not an image projector is present, i.e. whether or not an image projector is coupled to, in communication with, and/or otherwise available to the system. If the processor based apparatus 102 detects that an image projector is present, then in some embodiments the processor based apparatus 102 will generate and send additional content for projection. For example, additional scenes, characters, menus, or other images and/or video may be generated that are specifically intended for projection by the image projector.

Thus, in some embodiments, the image, images, and/or video that are projected from the image projector 108 are different than the image, images, and/or video being simultaneously displayed on the display 106. That is, the secondary images and/or video projected from the image projector 108 may or may not be the same images and/or video that are displayed on the display 106 at the same time or during the same time period. In some embodiments, a totally different image may be used for the projected image than what is displayed on the main display. In some embodiments, the images and/or video that are projected from the image projector 108 are different than the images and/or video being simultaneously displayed on the display 106, but the images and/or video that are projected from the image projector 108 are synchronized with the images and/or video being simultaneously displayed on the display 106. Thus, in some embodiments, the images and/or video that are projected from the image projector 108 are different, but they are synchronized with the computer simulation and the images and/or video being simultaneously displayed on the display 106. As such, this provides the user with a different environment/image in which to play video games or other computer simulations.

Figure 4C:
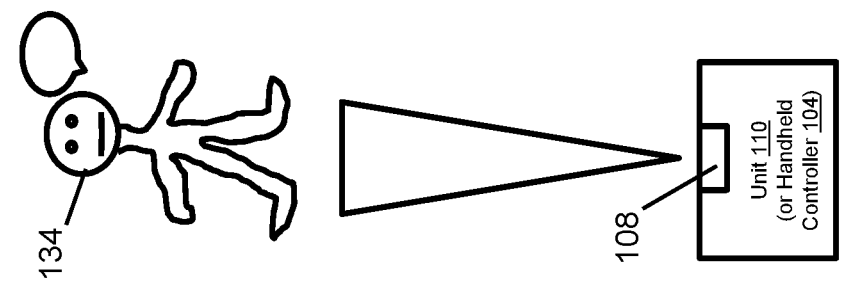
FIGS. 4A, 4B, and 4C are block diagrams illustrating example uses of an image projector in accordance with embodiments of the present invention.
Figure 4B:
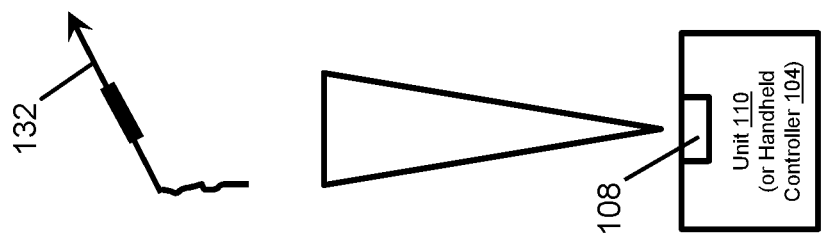
Figure 4A:
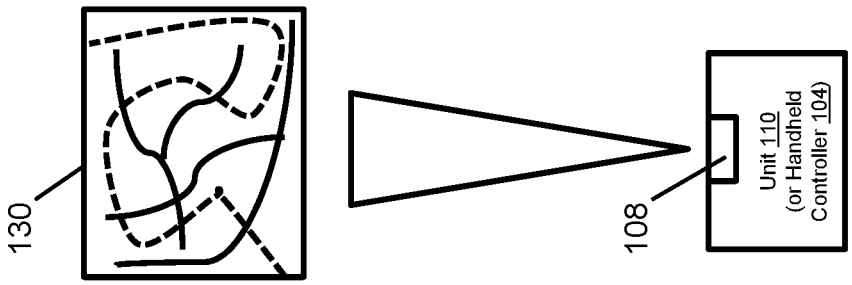

Reference will now be made to FIGS. 4A, 4B, and 4C to discuss example uses of the image projector 108. As mentioned above, in some embodiments the image projector 108 is built into the handheld controller 104 instead of using the unit 110. As such, the image projector 108 is illustrated as being housed in the "Unit 110 (or Handheld Controller 104)" since the image projector 108 may be housed in either the unit 110 or the handheld controller 104 in accordance with various embodiments of the present invention.

Referring specifically to FIG. 4A, a field map 130 may be projected by the image projector 108 while the user plays a first person shooter game that is displayed on the display 106. That is, the shooting is displayed on the display 106 but is not projected by the image projector 108, and the field map 130 is projected by the image projector 108 but is not displayed on the display 106. Thus, if the user needs to open a map, the map will be projected on the floor, wall, or some other surface instead of being displayed on the main display 106. As such, the image projector 108 adds a type of secondary display.

FIG. 4B illustrates another example. Namely, an item 132, such as a weapon like a sword or gun, may be projected by the image projector 108 but not displayed on the display 106. This feature may be used, for example, to allow the user to scroll through a list of items, such as weapons, the images of which are projected by the image projector 108 while something else related (or even unrelated) to the game or simulation is displayed on the display 106. Thus, instead of going to the play menu to pop up options/menus/items on the same display 106, the options/menus/items can be shown separately from the display 106 by projecting them onto the floor, wall, ceiling, etc., or even as a hologram, with the image projector 108.

FIG. 4C illustrates another example use for the image projector 108. Specifically, in some embodiments, the user may hear someone call him or her in the game, and then a face 134 pops up that is projected by the image projector 108. The face 134 may, for example, be that of a character in the game or simulation, or a team member or friend, or somebody else.

As mentioned above, in some embodiments the unit 110 also includes audio speakers or an audio output jack so that sounds can be heard by the user while viewing the projected image. This allows audio to be streamed to the unit 110 so that, for example, the face 134 can have a voice and talk to the user, perhaps to give instructions, plan strategy, etc. Thus, in some embodiments the secondary images and/or video projected from the image projector 108 also includes corresponding or associated secondary audio that is streamed to the unit 110 and played through speakers in the unit 110 or earbuds or headphones worn by the user. In some embodiments, the secondary audio is considered to be associated with the secondary images and/or video projected from the image projector 108 when the audio corresponds to, goes along with, or belongs with the images or video, such as a voice that is intended to belong to the person depicted in the images or video. As with the secondary projected images or video, the secondary audio may or may not be the same audio that is played with the display 106. In some embodiments, the secondary audio is not the same audio that is simultaneously played with the display 106.

In some embodiments, the unit 110 also includes a microphone. The microphone allows the unit 110 to also detect sounds, such as a user's voice, to send back to the processor based apparatus 102. This feature allows the user to talk to the projected image. For example, when the projected face 134 talks to the user, the user can talk back and carry on a conversation with the face 134.

Thus, in some embodiments the unit 110 is capable of projecting images and/or video on any surface, or forming a hologram in the air, and also playing sound that is associated with the images, video, or hologram. As such, audio can accompany the image or video projections. For example, the options/menus/items mentioned above can be projected by image projector 108 with associated audio.

In some embodiments, the image projector 108 projects images and/or video when the user uses the handheld controller 104 to make gestural commands. Specifically, if the handheld controller 104 is a motion sensing controller that is capable of sensing gestures, the computer simulation may generate images and/or video and send them to the image projector 108 so that the images and/or video are projected during one or more of the gestural commands. This way, the image projector 108 adds something extra to the gesture movement while the user is moving the handheld controller 104 around to make the gestural commands. For example, in some embodiments, the image projector 108 can project a shooting star or a rainbow while the controller 104 is moving during the gesture movement to make the command more exciting and entertaining. The state of the computer simulation can use this feature when it knows there will be gestural commands. Some computer simulations, such as some video games, do not use gestural commands. Thus, the use of gestural commands will depend on the particular computer simulation or game title. If there will be no gestural commands, the computer simulation will know that the handheld controller 104 will be relatively still and can use the image projector 108 to project items such as menus, maps, etc.

In some embodiments, the image projector 108 can be mechanically moved to change the angle of projection. For example, in some embodiments, the image projector 108 can be mechanically moved up/down and/or left/right and/or swivel to change the angle of projection. As such, in some embodiments the image projector 108 is coupled to the handheld controller 104 in a manner that allows an angle of projection with respect to the handheld controller 104 to be adjusted. In some embodiments, such coupling is accomplished by the image projector 108 being built into the handheld controller 104 and being capable of having its angle of projection adjusted. In some embodiments, such coupling is accomplished by the image projector 108 being housed in the unit 110, which can be docked and/or attached to the handheld controller 104, and the image projector 108 being capable of having its angle of projection adjusted.

Figure 5A:
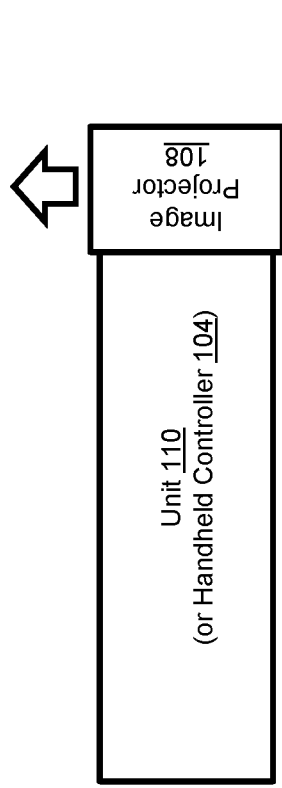
FIGS. 5A, 5B, and 5C are block diagrams illustrating the adjustment of an angle of projection of an image projector in accordance with embodiments of the present invention.
Figure 5B:
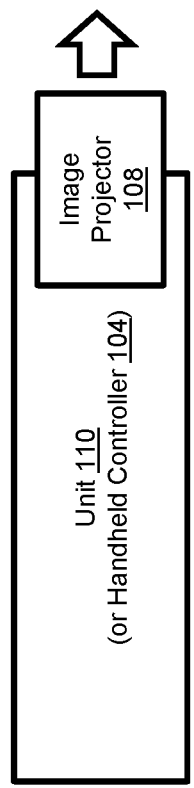
Figure 5C:
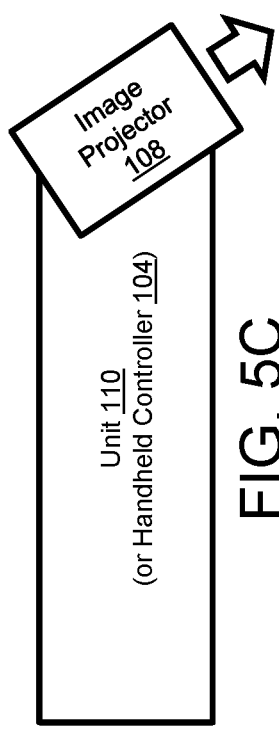

FIGS. 5A, 5B, and 5C illustrate examples of some embodiments of such coupling and the adjustment of the angle of projection of the image projector 108. Specifically, the image projector 108 is attached to the unit 110, or alternatively, the image projector 108 is attached directly to the handheld controller 104. With the figures being side views, FIG. 5A illustrates the image projector 108 being moved up, FIG. 5B illustrates the image projector 108 being moved so that it projects parallel to the floor, and FIG. 5C illustrates the image projector 108 being moved down. Thus, the angle of projection of the image projector 108 is rotated from being directed up, to being directed level, to being directed down. The angle of projection changes with respect to the handheld controller 104 whether the image projector 108 is attached directly to the handheld controller 104, or to the unit 110 since the unit 110 may be releasably docked or attached to the handled controller 104. In some embodiments, the image projector 108 swivels in order to change the angle of projection.

In some embodiments, the angle of projection of the image projector 108 is automatically adjusted according to a state of the computer simulation. For example, if the computer simulation comprises a video game, and the image projector 108 is projecting the image of a character in the game, the game state may at times send one or more signals or commands to automatically adjust and/or rotate the angle of projection of the image projector 108 in order to move the character or other projected image. As such, the game state can control the movement and rotation of the image projector 108. In some embodiments, miniaturized motors or other movement means are employed to automatically move the image projector 108 to change or adjust the angle of projection.

As mentioned several times above, in some embodiments the image projector 108 projects holographic images. Specifically, a hologram may be formed based on the one or more images generated by the computer simulation. The image projector 108 projects the images and/or video into the air to form the hologram. In some embodiments, a hologram is formed by projecting the images and/or video generated by the computer simulation in the direction of one or more clear panels or other type of panels that are appropriate for the creation of holograms. That is, the images and/or video are directed at, into, or through one or more clear panels or other type of panels that are appropriate for the creation of holograms. In some embodiments, the one or more clear panels may comprise acrylic panels.

In some embodiments, the clear panel may be coupled to the handheld controller. That is, in some embodiments, a small clear panel is coupled to the handheld controller so that it can project images and/or video above, beside, or below the handheld controller. FIGS. 6A and 6B illustrate examples of how a clear panel 140 may be coupled to the handheld controller. Specifically, the clear panel 140 may be attached to the unit 110, or alternatively, the clear panel 140 may be attached directly to the handheld controller 104. In some embodiments, the clear panel 140 may comprise an acrylic panel. In FIG. 6A the clear panel 140 is attached to a side of the unit 110 or controller 104, which minimizes a combined length of the assembly. The image projector 108 is rotated so that it projects into the clear panel 140. In FIG. 6B the clear panel 140 is attached to an end of the unit 110 or controller 104, which increases the combined length of the assembly but minimizes its width. The image projector 108 is rotated slightly so that it projects at the clear panel 140 at an angle.

In some embodiments, the angle of the clear panel 140 is adjustable or tunable. That is, the angle of the clear panel 140 with respect to the unit 110 or handheld controller 104 is adjustable or tunable. In some embodiments, this adjustability or tunability may be accomplished by attaching the clear panel 140 to the unit 110 or handheld controller 104 with a hinging, pivot, or axis mechanism 142.

In some embodiments, the angle of the clear panel is automatically adjusted according to a state of the computer simulation. For example, as part of the process of forming a hologram, the computer simulation may automatically adjust or tune the angle of the clear panel 140, as well as the angle of projection of the image projector 108, in order to create the proper conditions for forming a hologram. As another example, if the computer simulation comprises a video game, and the image projector 108 is using the clear panel 140 to project a hologram of a character in the game, the game state may automatically adjust or tune the angle of the clear panel 140 and/or the angle of projection of the image projector 108 in order to create the hologram, maintain the hologram, move the hologram, etc. In some embodiments, miniaturized motors or other movement means are employed or associated with the hinging, pivot, or axis mechanism 142 to automatically move the clear panel 140 to change, adjust, or tune its angle.

In some embodiments, a hologram is formed by projecting the images and/or video generated by the computer simulation in a direction of small or tiny particles suspended in the air. By way of example, the small or tiny particles suspended in the air may comprise fog, vapor, dust, or any other material that can be suspended in air and have light projected thereon. For example, the vapor produced by a device such as an e-cigarette is believed to be a material that can be suspended in air and have light projected thereon.

Figure 7:
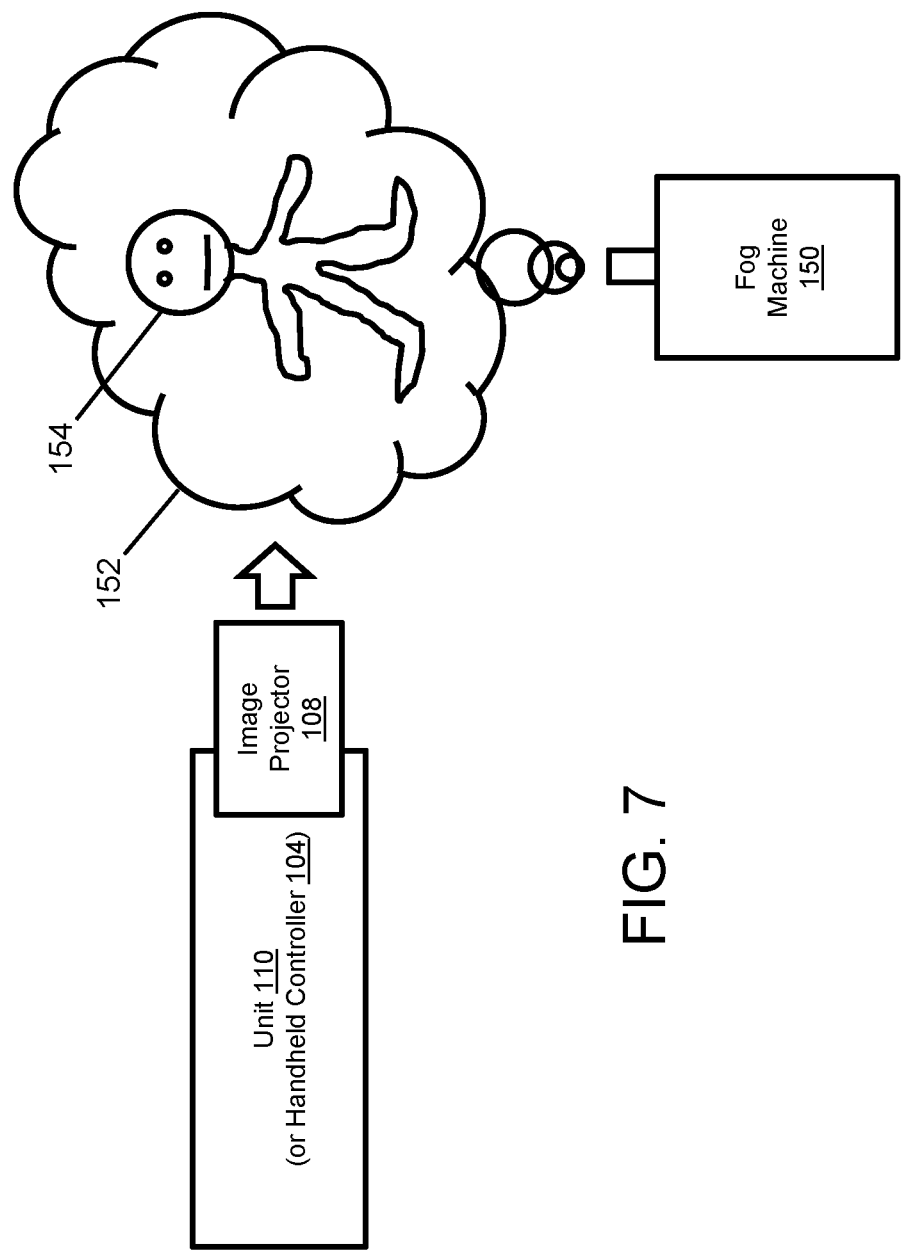
FIG. 7 is a block diagram illustrating the use of fog, or other tiny particles suspended in air, and an image projector to form a hologram in accordance with embodiments of the present invention.

FIG. 7 illustrates an example of using small particles suspended in air to create a hologram. Specifically, a fog machine 150 creates fog 152. The image projector 108 projects images and/or video in a direction of, onto, into, or through the fog 152. The projection of light onto the material that comprises the fog 152 creates a hologram 154, which in the illustrated example is a game character.

In some embodiments, the small particles suspended in the air are automatically established according to a state of the computer simulation. For example, as part of the process of forming a hologram, the computer simulation may automatically control the fog machine 150, or other particle producing apparatus, as well as the angle of projection of the image projector 108, in order to create the proper conditions for forming a hologram. As another example, if the computer simulation comprises a video game, and the game state calls for the creation of a holographic character 154, the game state may automatically control the fog machine 150, or other particle producing apparatus, as well as the angle of projection of the image projector 108, in order to create, maintain, or move a hologram depicting the character. That is, the game state will control the fog machine 150 to release or establish fog 152 in the air, and then the game state will control the image projector 108 to project images or video onto the fog 152 to create the hologram 154.

Figure 8:
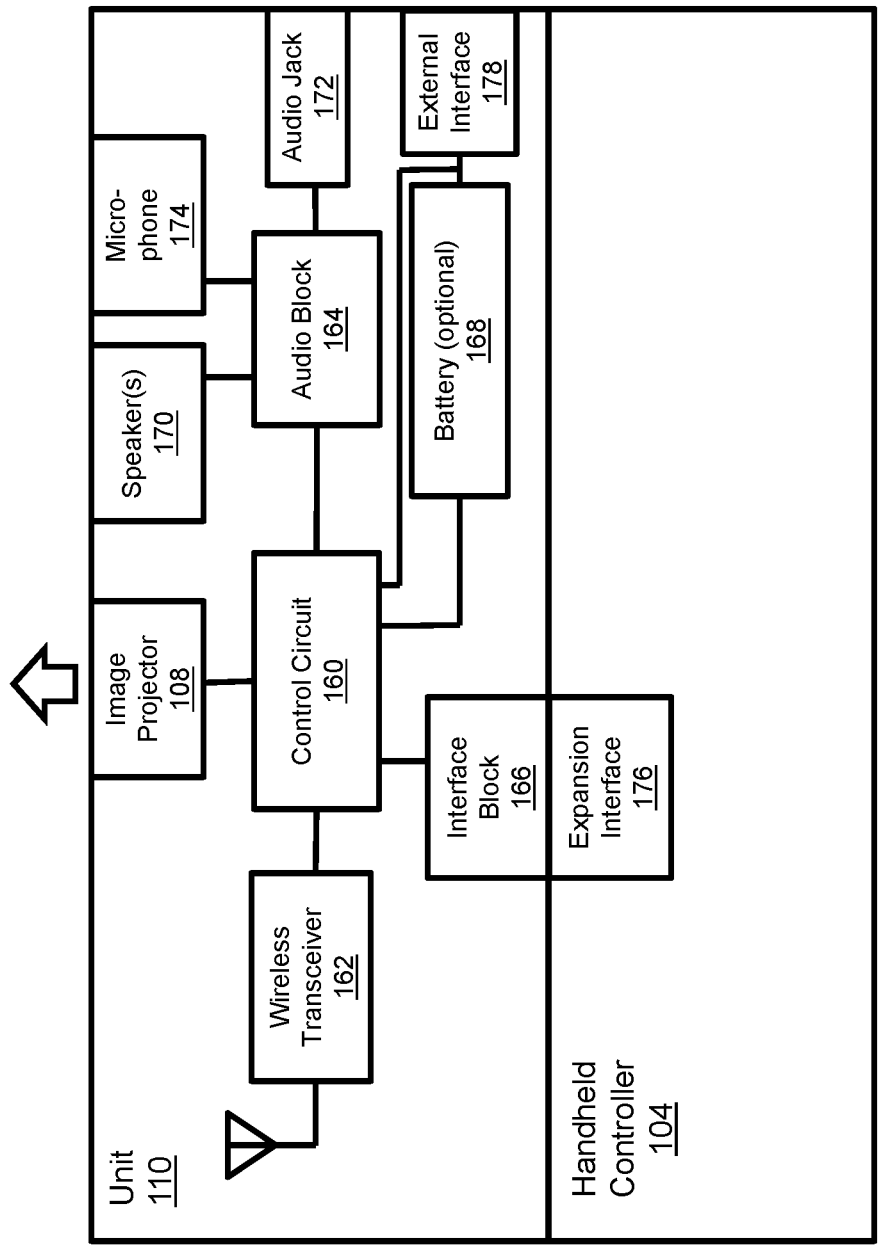
FIG. 8 is a block diagram illustrating example components of a unit in accordance with embodiments of the present invention.

Referring to FIG. 8, there is illustrated an example configuration of hardware and circuitry components that may be used in some embodiments in the unit 110 to support the image projector 108. As illustrated, the components include the image projector 108 (which may also be referred to as an optical block), a control circuit block 160, a wireless block 162, an audio block 164, an interface block 166, an external interface block 178, and a battery block 168.

As mentioned above, in some embodiments the image projector 108 may comprise any type of image projector, such as for example, but not limited to, a pico projector, handheld projector, or mobile projector. In some embodiments, the image projector 108 may comprise a micro projector module. Furthermore, in some embodiments the image projector 108 may employ any imager technology, such as for example, but not limited to, Digital Light Processing (DLP), Liquid Crystal on Silicon (LCoS), and laser.

The image projector 108 is coupled to the control circuit block 160. In some embodiments, the control circuit block 160 may comprise a microprocessor and a CODEC (coder-decoder). In some embodiments, the control circuit block 160 is configured for implementing one or more of the features, methods, and techniques described herein.

The wireless block 162 is also coupled to the control circuit block 160. The wireless block 162 is used for receiving data from, and sending data to, the host, i.e. the processor based apparatus 102. For example, the wireless block 162 may be used for receiving one or more images and/or video generated by the computer simulation from the processor based apparatus 102. The wireless block 162 may also be used for transmitting data, such audio data for the user's voice, to the processor based apparatus 102. As mentioned above, in some embodiments the wireless block 162 uses WiFi or another wireless connection technique to send data between the processor based apparatus 102 and the unit 110.

The audio block 164 is also coupled to the control circuit block 160. As mentioned above, in some embodiments the unit 110 includes one or more audio speakers 170 and/or an audio output jack 172 (for connection to external speakers) so that sounds can be heard by the user while viewing the images or video projected by the image projector 108. In some embodiments, the speakers 170 and/or output jack 172 may be configured for stereo sound. The one or more audio signals received from the processor based apparatus 102 may be associated with the projected images or video. Furthermore, as also mentioned above, in some embodiments the unit 110 also includes a microphone 174. The microphone 174 allows the unit 110 to detect sounds, such as a user's voice, to send to the processor based apparatus 102 via the wireless block 162. In some embodiments, voice recognition software or techniques may be employed by the audio block 164 and/or the processor based apparatus 102 for recognizing or translating voice received by the microphone 174.

The interface block 166, which is used in some embodiments, is also coupled to the control circuit block 160. The interface block 166 is used for interfacing with the handheld controller 104 when the unit 110 is releasably docked with the handheld controller 104. The interface block 166 couples to a corresponding interface 176, such as an expansion interface, in the handheld controller 104. Thus, the interface block 166 provides for communication between the unit 110 and the handheld controller 104. In some embodiments, the interface block 166 allows the unit 110 to use one or more resources located in the handheld controller 104, such as for example, power from the handheld controller 104, one or more audio speakers that might be in the handheld controller 104, a microphone that might be in the handheld controller 104, control signals generated by the handheld controller 104, etc. For example, some handheld controllers are provided with audio signals so that users can plug earphones or headphones into the handheld controller. In some embodiments, the interface block 166 and corresponding interface 176 allows the unit 110 to obtain the audio signals from the handheld controller 104. In such a scenario, in some embodiments, the unit 110 does not need to obtain the audio signals from the processor based apparatus 102.

The battery block 168, which is optional and is used in some embodiments, is also coupled to the control circuit block 160. Specifically, in some embodiments, power is provided to the unit 110 by the handheld controller 104 when the unit 110 is docked with the handheld controller 104. And when the unit 110 is undocked from the handheld controller 104 and in stand-alone configuration, power can be supplied to the unit 110 from a wall plug. Thus, in these scenarios the battery block 168 may not be needed and can be eliminated. But if the handheld controller 104 cannot supply enough power to the unit 110 when the unit 110 is docked with the handheld controller 104, the battery block 168 may be needed. Similarly, the battery block 168 may be needed for the stand-alone configuration if a wall plug is not available. In some embodiments, the battery block 168 comprises rechargeable battery technology through the external interface block 178.

The external interface block 178, which is used in some embodiments, is also coupled to the control circuit block 160 and the battery block 168. The external interface block 178 is used for interfacing with the processor based apparatus 102 when the wireless environment is not available and/or the wireless transceiver 162 is in sleep mode, or when the unit 110 is powered from an external power source. The external interface block 178 can provide for communication between the unit 110 and the processor based apparatus 102. In some embodiments, the external interface block 178 allows the unit 110 to obtain one or more resources from the processor based apparatus 102, such as for example, power from the processor based apparatus 102, audio signals generated by the processor based apparatus 102, video signals generated by the processor based apparatus 102, and control signals generated by the processor based apparatus 102. In some embodiments, the external interface block 178 allows the processor based apparatus 102 to use a microphone signal in the unit 110.

Figure 9:
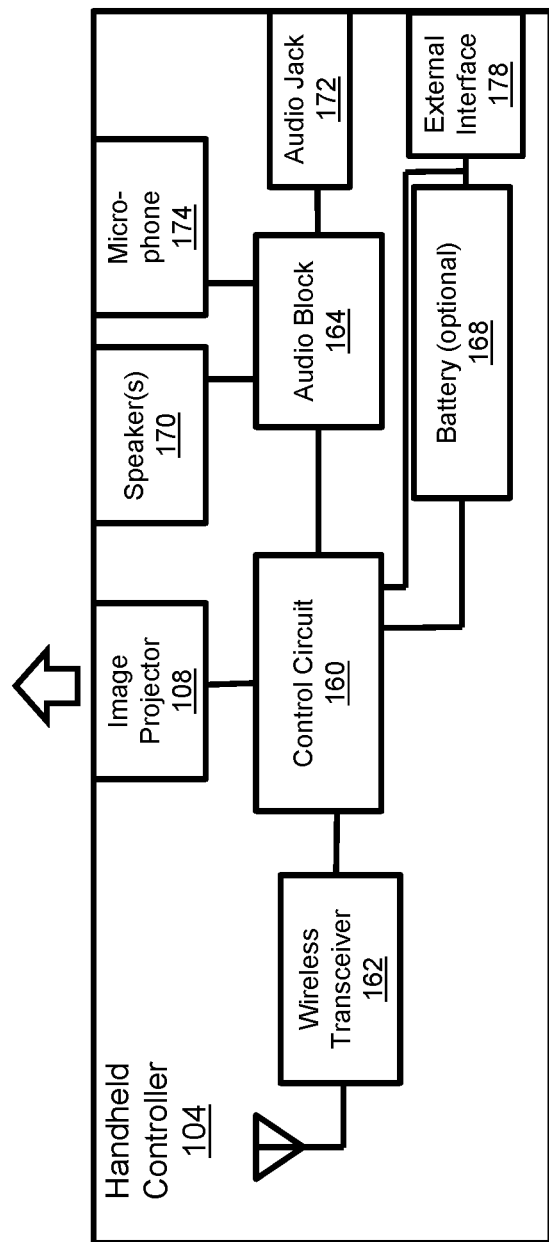
FIG. 9 is a block diagram illustrating example components of a handheld controller in accordance with embodiments of the present invention.

As mentioned above, in some embodiments the image projector 108 is built into the handheld controller 104. As such, in some embodiments the unit 110 is not needed and many of the components illustrated in FIG. 8 are instead housed in the handheld controller 104 along with the usual components that make up the handheld controller 104. FIG. 9 illustrates an example configuration of hardware and circuitry components that may be used in some embodiments in the handheld controller 104 to support the image projector 108. Similar to the unit 110, the components include the image projector 108 (which may also be referred to as an optical block), a control circuit block 160, a wireless block 162, an external interface block 178, and an audio block 164, which operate similar to as described above. But unlike the unit 110, an interface block 166 for interfacing with a handheld controller is not needed because the components are built into the handheld controller 104. Furthermore, a battery block 168 may not be needed if enough power is available in the handheld controller 104. However, if there is not enough power available in the handheld controller 104, then a battery block 168 can certainly be included.

Thus, FIG. 9 illustrates an example of the image projector 108 being coupled to the handheld controller 104 by being built into the handheld controller 104. That is, FIG. 9 illustrates an example of the image projector 108 being included and/or mounted in the housing of the handheld controller 104.

Figure 10:
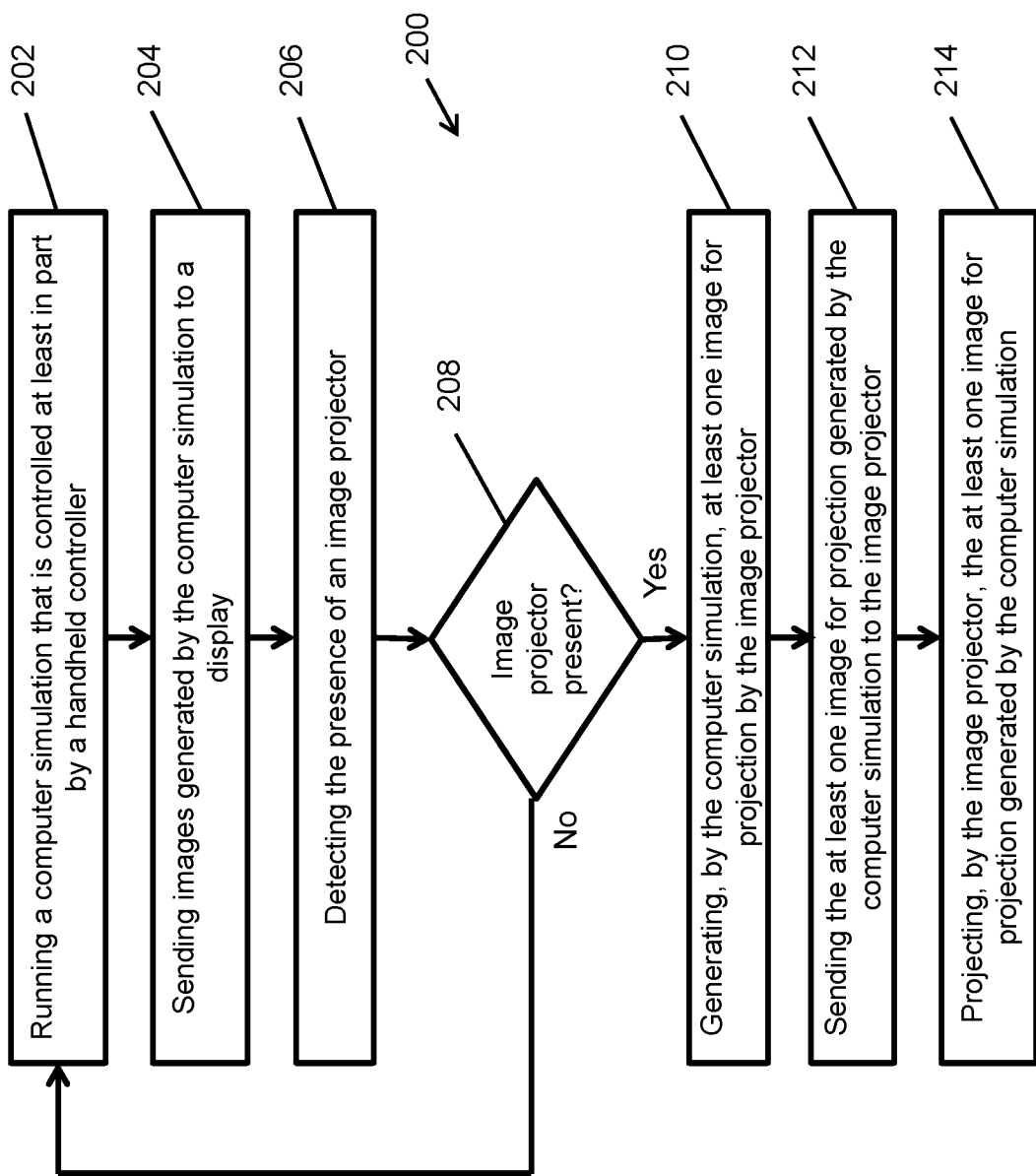
FIG. 10 is a flow diagram illustrating a method in accordance with embodiments of the present invention.

An example of the operational flow of the system 100 (FIGS. 1-3) for some embodiments is illustrated by the method 200 shown in FIG. 10. It should be understood that not all of the steps of the method 200 are required in some embodiments. That is, some embodiments do not include all of the steps of the method 200. Indeed, some of the steps of the method 200 are optional. In some embodiments, one or more of the steps of the method 200 may be executed by a processor based apparatus or system, such as the processor based apparatus 102 described above, which in some embodiments may comprise a game console, entertainment system, handheld device, mobile device, personal computer, workstation, etc.

The method 200 begins in step 202 in which a computer simulation is run. The computer simulation is of a type that is controlled at least in part by a handheld controller, such as for example a game controller, game pad, wand, mobile device, handheld device, or any of the other types of handheld controllers mentioned herein. In some embodiments, the computer simulation may comprise a computer game, video game, or any other type of computer simulation.

In step 204, images generated by the computer simulation are sent to a display. The display may comprise any type of display, such as a monitor, TV, or any other type of display.

In step 206, the presence of an image projector is detected. For example, in some embodiments, a processor based apparatus will detect or determine whether or not an image projector is coupled to, in communication with, and/or otherwise available to the system.

The result of step 206 is determined by decision block 208. If the processor based apparatus detects that an image projector is present, then the answer in decision block 208 is "yes", which means in some embodiments the processor based apparatus will proceed to generate and/or send additional content for projection. As such, the process flow continues on to step 210 where the additional content is generated.

On the other hand, if the processor based apparatus does not detect that an image projector is present, then the answer in decision block 208 is "no", and the process flow returns to step 202. Thus, if the system does not have access to an image projector, then in some embodiments the processor based apparatus will only generate and/or send content for the main display.

If an image projector is present, then in step 210 at least one image for projection by the image projector is generated by the computer simulation. For example, additional scenes, characters, menus, or other images and/or video may be generated that are specifically intended for projection by the image projector. As another example, in a video game, if the game state detects the presence of the image projector, then the processor based apparatus will generate the face of an enemy character, teammate, boss, maps, and/or other items for the image projector to project. These items can be projected on the wall, the floor, or as a hologram in the air. In some embodiments, one or more images, moving images, video, and/or holograms are generated. In some embodiments, the generated images and/or video are different than the images and/or video that is being simultaneously displayed on the display. Thus, in some embodiments, when an image projector is present and/or available to the system, then additional content is generated for projection by the image projector.

In step 212, the at least one image for projection generated by the computer simulation is sent to the image projector. In some embodiments, the one or more images and/or video are sent to the image projector via wireless transmission. In some embodiments, the image projector is coupled to the handheld controller in any of the ways described herein above.

In step 214, the image projector projects the at least one image for projection generated by the computer simulation. In some embodiments, the at least one image is projected onto a surface. In some embodiments, the at least one image is used to form a hologram.

In some embodiments, the methods, schemes, and techniques described herein may be utilized, implemented and/or run on many different types of processor based apparatuses or systems. For example, the methods, schemes, and techniques described herein may be utilized, implemented and/or run on game consoles, entertainment systems, portable devices, mobile devices, pad-like devices, computers, workstations, desktop computers, notebook computers, servers, etc. Furthermore, in some embodiments the methods, schemes, and techniques described herein may be utilized, implemented and/or run in online scenarios, networked scenarios, over the Internet, etc.

Figure 11:
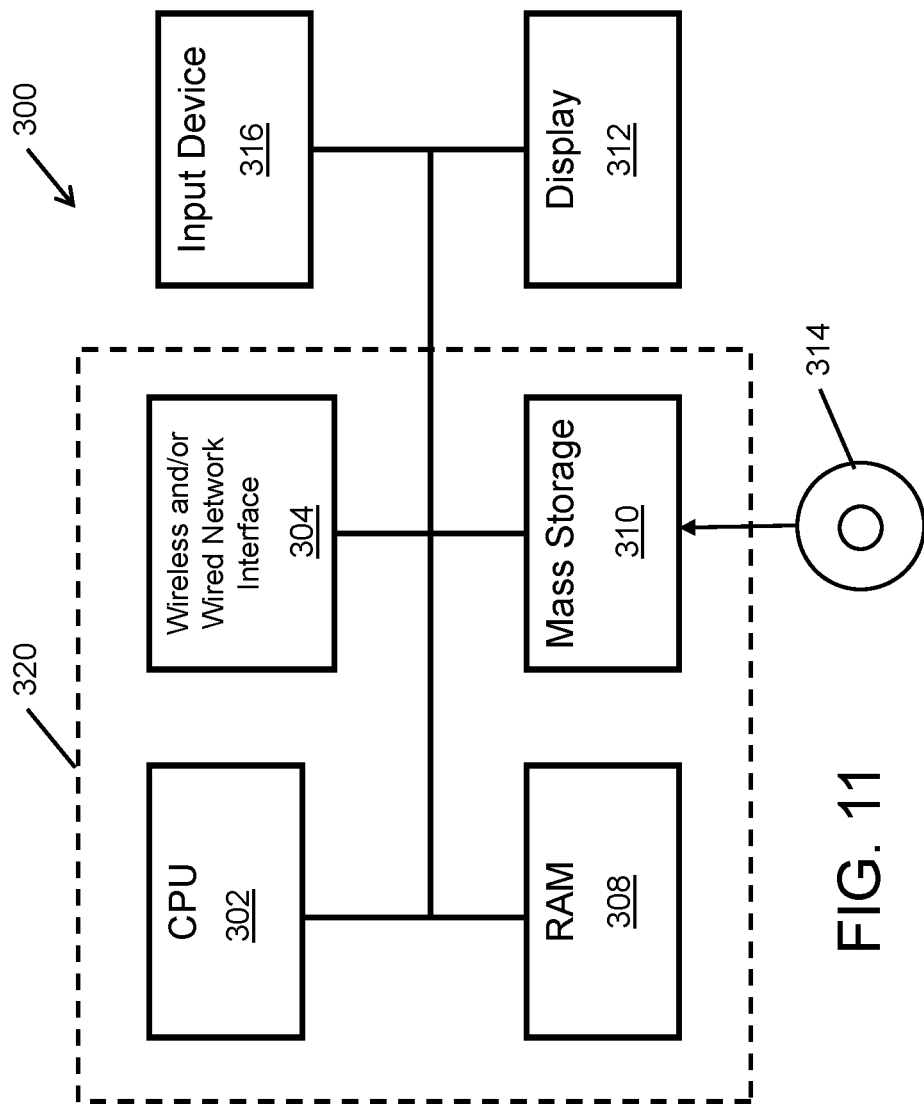
FIG. 11 is a block diagram illustrating a processor based apparatus/system that may be used to run, implement, and/or execute any of the methods, schemes, and techniques shown and described herein in accordance with the embodiments of the present invention.

Referring to FIG. 11, there is illustrated an example of a system 300 that may be used for any such implementations. The system 300 includes a processor based apparatus or system 320 that may also be used for any such implementations. For example, in some embodiments, one or more components of the system 300 or the processor based apparatus or system 320 may be used for implementing any method, scheme, technique, system, or device mentioned above, such as for example any of the above-mentioned game consoles, entertainment systems, portable devices, mobile devices, pad-like devices, computers, workstations, desktop computers, notebook computers, servers, etc. However, the use of the system 300, the processor based apparatus or system 320, or any portion thereof is certainly not required. By way of example, in some embodiments, the system 300, or the processor based apparatus or system 320, or any portions thereof, may be used for implementing the system 100 (FIGS. 1-3) or any portion or component of the system 100 described above. For example, in some embodiments, the processor based apparatus or system 320 may be used for implementing the processor based apparatus 102. In some embodiments, the display 312 may correspond to the display 106, and the input device 316 may correspond to the handheld controller 104.

By way of example, the processor based apparatus or system 320 (FIG. 11) may include, but is not required to include, a central processing unit (CPU) 302, a wireless and/or wired network interface 304, a random access memory (RAM) 308, and a mass storage unit 310, such as a disk drive. The system 320 may be coupled to, or integrated with, any of the other components described herein, such as a display 312 and/or an input device 316. In some embodiments, the system 320 comprises an example of a processor based apparatus or system. In some embodiments, such a processor based apparatus or system may also be considered to include the display 312 and/or the input device 316. The CPU 302 may be used to execute or assist in executing the steps of the methods, schemes, and techniques described herein, and various program content, images, video, menus, menu screens, interfaces, graphical user interfaces (GUIs), windows, tables, graphics, avatars, characters, players, video games, simulations, virtual worlds, etc., may be rendered on the display 312.

In some embodiments, the wireless and/or wired network interface 304 may be used to provide any necessary functionality for implementing any of the above-mentioned wireless streaming, wireless connections, WiFi, etc. For example, in some embodiments, the wireless and/or wired network interface 304 may be used to provide for the wireless streaming of audio, images and/or video between the processor based apparatus 102 (FIGS. 1-3) and the unit 110, handled controller 104, and/or image projector 108. For example, in some embodiments, the wireless and/or wired network interface 304 may be used for wireless communications with the wireless block 162 (FIGS. 8-9). In some embodiments, the wireless and/or wired network interface 304 provides any necessary functionality for interfacing the system 320 with a network, such as a local area network, the Internet, an intranet, a wide area network, or any other network.

The input device 316 may comprise any type of input device or input technique or method. For example, the input device 316 may comprise a handheld controller, game controller, game pad, wand, motion sensing controller, joystick, keyboard, mouse, touch pad, trackball, camera, sensor, or other input devices and/or input techniques. The input device 316 may be wireless or wired, e.g. it may be wirelessly coupled to the system 320 or comprise a wired connection. In some embodiments, the input device 316 may comprise means or sensors for sensing and/or tracking the movements and/or motions of a user and/or an object controlled by a user. The display 312 may comprise any type of display or display device or apparatus, such as for example, but not limited to, a monitor, TV, etc.

The mass storage unit 310 may include or comprise any type of computer readable storage or recording medium or media. The computer readable storage or recording medium or media may be fixed in the mass storage unit 310, or the mass storage unit 310 may optionally include removable storage media 314, such as a digital video disk (DVD), Blu-ray disc, compact disk (CD), USB storage device, floppy disk, or other media. By way of example, the mass storage unit 310 may comprise a disk drive, a hard disk drive, flash memory device, USB storage device, Blu-ray disc drive, DVD drive, CD drive, floppy disk drive, etc. The mass storage unit 310 or removable storage media 314 may be used for storing code or macros that implement the methods and techniques described herein.

Thus, removable storage media 314 may optionally be used with the mass storage unit 310, which may be used for storing program or computer code that implements the methods and techniques described herein, such as program code for running the above-described methods, schemes, and techniques. However, any of the storage devices, such as the RAM 308 or mass storage unit 310, may be used for storing such code. For example, any of such storage devices may serve as a tangible non-transitory computer readable storage medium for storing or embodying one or more computer programs or software applications for causing a game console, entertainment system, mobile device, system, computer, workstation, server, client, or other processor based apparatus or system to execute or perform the steps of any of the methods, code, schemes, and/or techniques described herein. Furthermore, any of the storage devices, such as the RAM 308, mass storage unit 310, or removable storage media 314 may be used for storing any needed database(s).

Thus, as mentioned above, in some embodiments, the processor based apparatus or system 320 may be used for implementing the processor based apparatus 102 (FIGS. 1-3). In some embodiments, the display 312 may correspond to the display 106, and the input device 316 may correspond to the handheld controller 104.

In some embodiments, one or more of the embodiments, methods, approaches, schemes, and/or techniques described above may be implemented in one or more computer programs or software applications executable by a processor based apparatus or system. By way of example, such processor based system may comprise the processor based apparatus or system 320 (FIG. 11), or an entertainment system, game console, mobile device, computer, workstation, desktop computer, notebook computer, server, graphics workstation, client, portable device, pad-like device, etc. Such computer program(s) or software may be used for executing various steps and/or features of the above-described methods, schemes, and/or techniques. That is, the computer program(s) or software may be adapted or configured to cause or configure a processor based apparatus or system to execute and achieve the functions described herein. For example, such computer program(s) or software may be used for implementing any embodiment of the above-described methods, steps, techniques, schemes, or features. As another example, such computer program(s) or software may be used for implementing any type of tool or similar utility that uses any one or more of the above described embodiments, methods, approaches, schemes, and/or techniques. In some embodiments, one or more such computer programs or software may comprise a tool, utility, application, computer simulation, computer game, video game, role-playing game (RPG), other computer simulation, or system software such as an operating system, BIOS, macro, or other utility. In some embodiments, program code macros, modules, loops, subroutines, calls, etc., within or without the computer program(s) may be used for executing various steps and/or features of the above-described methods, schemes and/or techniques. In some embodiments, such computer program(s) or software may be stored or embodied in a non-transitory computer readable storage or recording medium or media, such as any of the tangible computer readable storage or recording medium or media described above. In some embodiments, such computer program(s) or software may be stored or embodied in transitory computer readable storage or recording medium or media, such as in one or more transitory forms of signal transmission (for example, a propagating electrical or electromagnetic signal).

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, schemes, and/or techniques described herein. For example, in some embodiments the present invention provides one or more non-transitory computer readable storage mediums storing one or more computer programs adapted or configured to cause a processor based apparatus or system to execute steps comprising: running a computer simulation that is controlled at least in part by a handheld controller; sending images generated by the computer simulation to a display; and sending at least one image generated by the computer simulation to an image projector coupled to the handheld controller. As another example, in some embodiments the present invention provides one or more non-transitory computer readable storage mediums storing one or more computer programs adapted or configured to cause a processor based apparatus or system to execute steps comprising: running a computer simulation that is controlled at least in part by a handheld controller; sending images generated by the computer simulation to a display; and sending at least one image generated by the computer simulation to an image projector that is housed in a unit configured to be releasably docked to the handheld controller.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:
running, with a processor based apparatus, a computer simulation that is controlled at least in part by a handheld controller;
displaying images generated by the computer simulation on a display; and
projecting at least one image generated by the computer simulation from an image projector coupled to the handheld controller, wherein the at least one image projected from the image projector includes content that is not part of a scene being displayed on the display.

2. The method of claim 1, wherein the at least one image projected from the image projector includes an additional scene.

3. The method of claim 1, wherein the at least one image projected from the image projector includes an additional character.

4. The method of claim 1, wherein the at least one image projected from the image projector includes at least one of a team member of a user of the computer simulation or a friend of the user of the computer simulation.

5. The method of claim 1, wherein the at least one image projected from the image projector includes at least one of a menu, a map, or a weapon.

6. The method of claim 1, wherein the at least one image projected from the image projector includes content specifically intended for the image projector and which would not otherwise be generated without the image projector.

7. The method of claim 1, further comprising:
detecting a presence of the image projector coupled to the handheld controller; and
in response to detecting a presence of the image projector coupled to the handheld controller, the computer simulation generating the at least one image and the image projector projecting the at least one image simultaneously with the images being displayed on the display.

8. The method of claim 1, wherein the at least one image projected from the image projector is different than images being simultaneously displayed on the display.

9. The method of claim 1, further comprising:
wirelessly streaming the at least one image generated by the computer simulation to a location of the image projector coupled to the handheld controller before the at least one image generated by the computer simulation is projected from the image projector.

10. The method of claim 1, further comprising:
providing one or more audio signals to a location of the image projector coupled to the handheld controller, wherein the one or more audio signals are generated by the computer simulation and are associated with the at least one image projected from the image projector.

11. The method of claim 10, wherein the providing one or more audio signals to a location of the image projector coupled to the handheld controller comprises:
wirelessly streaming the one or more audio signals to a location of the image projector coupled to the handheld controller.

12. The method of claim 1, further comprising:
automatically adjusting an angle of projection of the image projector according to a state of the computer simulation.

13. The method of claim 1, wherein the projecting at least one image generated by the computer simulation from the image projector coupled to the handheld controller comprises:
forming a hologram based on the at least one image generated by the computer simulation.

14. The method of claim 1, wherein the projecting at least one image generated by the computer simulation from the image projector coupled to the handheld controller comprises:
projecting the at least one image generated by the computer simulation in a direction of a clear panel.

15. The method of claim 14, wherein the clear panel is coupled to the handheld controller.

16. The method of claim 14, further comprising:
automatically adjusting an angle of the clear panel according to a state of the computer simulation.

17. The method of claim 1, wherein the projecting at least one image generated by the computer simulation from the image projector coupled to the handheld controller comprises:
projecting the at least one image generated by the computer simulation in a direction of small particles suspended in the air.

18. The method of claim 17, wherein the small particles suspended in the air comprise fog.

19. The method of claim 17, further comprising:
automatically establishing the small particles suspended in the air according to a state of the computer simulation.

20. A system, comprising:
a display;
a handheld controller;
an image projector coupled to the handheld controller; and
a processor based apparatus in communication with the display, the handheld controller, and the image projector;
wherein the processor based apparatus is configured to execute steps comprising:
running a computer simulation that is controlled at least in part by the handheld controller;
sending images generated by the computer simulation to the display; and
sending at least one image generated by the computer simulation to the image projector, wherein the at least one image sent to the image projector includes content that is not part of a scene being displayed on the display.

21. The system of claim 20, wherein the at least one image generated by the computer simulation that is sent to the image projector includes an additional scene.

22. The system of claim 20, wherein the at least one image generated by the computer simulation that is sent to the image projector includes an additional character.

23. The system of claim 20, wherein the at least one image generated by the computer simulation that is sent to the image projector includes at least one of a team member of a user of the computer simulation or a friend of the user of the computer simulation.

24. The system of claim 20, wherein the at least one image generated by the computer simulation that is sent to the image projector includes at least one of a menu, a map, or a weapon.

25. The system of claim 20, wherein the at least one image generated by the computer simulation that is sent to the image projector includes content specifically intended for the image projector and which would not otherwise be generated without the image projector.

26. The system of claim 20, wherein the processor based apparatus is further configured to execute steps comprising:
detecting a presence of the image projector coupled to the handheld controller; and
in response to detecting a presence of the image projector coupled to the handheld controller, the computer simulation generating the at least one image and sending the at least one image to the image projector simultaneously with the images being sent to the display.

27. The system of claim 20, wherein the at least one image generated by the computer simulation that is sent to the image projector is different than images generated by the computer simulation being simultaneously sent to the display.

28. The system of claim 20, wherein the processor based apparatus is further configured to execute steps comprising:
automatically adjusting an angle of projection of the image projector with respect to the handheld controller according to a state of the computer simulation.

29. The system of claim 20, wherein the processor based apparatus is further configured to execute steps comprising:
controlling the image projector to form a hologram based on the at least one image generated by the computer simulation.

30. A non-transitory computer readable storage medium storing one or more computer programs configured to cause a processor based system to execute steps comprising:
running a computer simulation that is controlled at least in part by a handheld controller;
sending images generated by the computer simulation to a display; and
sending at least one image generated by the computer simulation to an image projector coupled to the handheld controller, wherein the at least one image sent to the image projector includes content that is not part of a scene being displayed on the display.

31. The non-transitory computer readable storage medium of claim 30, wherein the at least one image generated by the computer simulation that is sent to the image projector includes an additional scene.

32. The non-transitory computer readable storage medium of claim 30, wherein the at least one image generated by the computer simulation that is sent to the image projector includes at least one of a team member of a user of the computer simulation or a friend of the user of the computer simulation.

33. The non-transitory computer readable storage medium of claim 30, wherein the at least one image generated by the computer simulation that is sent to the image projector includes at least one of a menu, a map, or a weapon.

34. The non-transitory computer readable storage medium of claim 30, wherein the at least one image generated by the computer simulation that is sent to the image projector includes content specifically intended for the image projector and which would not otherwise be generated without the image projector.

35. The non-transitory computer readable storage medium of claim 30, wherein the one or more computer programs are further configured to cause the processor based system to execute steps comprising:
    detecting a presence of the image projector; and
    in response to detecting a presence of the image projector, sending the at least one image generated by the computer simulation to the image projector simultaneously with the images being sent to the display.

36. A non-transitory computer readable storage medium storing one or more computer programs configured to cause a processor based system to execute steps comprising:
    running a computer simulation that is controlled at least in part by a handheld controller;
    sending images generated by the computer simulation to a display; and
    sending at least one image generated by the computer simulation to an image projector that is housed in a unit configured to be releasably docked to the handheld controller, wherein the at least one image sent to the image projector includes content that is not part of a scene being displayed on the display.

37. The non-transitory computer readable storage medium of claim 36, wherein the at least one image generated by the computer simulation that is sent to the image projector includes an additional scene.

38. The non-transitory computer readable storage medium of claim 36, wherein the at least one image generated by the computer simulation that is sent to the image projector includes at least one of a team member of a user of the computer simulation or a friend of the user of the computer simulation.

39. The non-transitory computer readable storage medium of claim 36, wherein the at least one image generated by the computer simulation that is sent to the image projector includes at least one of a menu, a map, or a weapon.

40. The non-transitory computer readable storage medium of claim 36, wherein the one or more computer programs are further configured to cause the processor based system to execute steps comprising:
    detecting a presence of the image projector; and
    in response to detecting a presence of the image projector, sending the at least one image generated by the computer simulation to the image projector simultaneously with the images being sent to the display.

* * * * *